United States Patent
Guicheteau

(10) Patent No.: US 7,475,936 B2
(45) Date of Patent: Jan. 13, 2009

(54) LIGHT-PERMEABLE ROOF ELEMENT FOR MOTOR VEHICLES

(75) Inventor: Jean-Luc Guicheteau, Aix en Provence (FR)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/572,937

(22) PCT Filed: Jul. 29, 2005

(86) PCT No.: PCT/DE2005/001347

§ 371 (c)(1),
(2), (4) Date: Jan. 30, 2007

(87) PCT Pub. No.: WO2006/012873

PCT Pub. Date: Feb. 9, 2006

(65) Prior Publication Data

US 2007/0267899 A1   Nov. 22, 2007

(30) Foreign Application Priority Data

Jul. 30, 2004   (FR) .................................. 04 08428

(51) Int. Cl.
    B62D 25/06   (2006.01)
(52) U.S. Cl. ........................... 296/215; 156/108
(58) Field of Classification Search .............. 296/210, 296/215; 156/108
    See application file for complete search history.

(56) References Cited

U.S. PATENT DOCUMENTS

| | | | |
|---|---|---|---|
| 4,219,230 A * | 8/1980 | Lapine | 296/201 |
| 6,375,254 B1 * | 4/2002 | Patz | 296/216.09 |
| 6,513,864 B2 | 2/2003 | Boehm et al. | |
| 6,793,277 B2 * | 9/2004 | Chon et al. | 296/215 |
| 6,848,739 B2 | 2/2005 | Stallfort et al. | |
| 6,869,137 B2 * | 3/2005 | Schonebeck | 296/210 |
| 6,913,310 B2 | 7/2005 | Albert | |
| 6,971,704 B2 | 12/2005 | Cocaign | |
| 2005/0104418 A1 * | 5/2005 | Zirbs | 296/210 |

FOREIGN PATENT DOCUMENTS

| | | | |
|---|---|---|---|
| DE | 10237322 A1 | 3/2004 | |
| EP | 1440869 A1 | 7/2004 | |

* cited by examiner

Primary Examiner—Dennis H Pedder
(74) Attorney, Agent, or Firm—Marshall, Gerstein & Borun LLP

(57) ABSTRACT

A roof element 1 which is designed to close an opening which is made in the roof of a motor vehicle having a translucent pane which is to be permanently connected to the contact surface which borders the roof opening, especially for a contact surface originally designed to receive a sheet metal panel instead of a glass pane roof element. The roof element has at least one transition element which is joined permanently to the inner peripheral surface of the pane, and has a support surface which is parallel to the part of the contact surface on which the indicated support surface is to be superimposed.

16 Claims, 2 Drawing Sheets

LIGHT-PERMEABLE ROOF ELEMENT FOR MOTOR VEHICLES

BACKGROUND OF THE INVENTION

1. Field of the Invention

This invention relates to a translucent roof element which is designed to close an opening made in the roof of a motor vehicle.

2. Description of Related Art

It is known that the roof of a motor vehicle can be formed at least partially by a transparent or translucent pane, especially of glass or plastic material. In the known manner, the opening made in the roof is bordered by a stop which forms a contact surface and a terminating surface which is designed to hold the peripheral edge of the glass pane.

Generally, the opening extends in the transverse direction between the side roof elements of the body and in the lengthwise direction between the front roof element which separates the inside roof lining and the windshield, and the rear roof element which separates the inside roof lining and the rear window or rear hatch. The side roof elements, the front roof element and the rear roof element each have a separate peripheral stop on their edge which is located opposite the opening. The combination of these four individual peripheral stops forms the contact surface which makes it possible to hold the peripheral edge of the glass pane, permanent connection of which takes place in the known manner by cementing.

In practice, a motor vehicle with a glass roof is simply a derivative of a traditional model with a sheet metal roof. This means that the glass pane must be cemented onto a standard body, i.e., therefore, onto a contact surface which is not specifically designed for this purpose. Since at this point this contact surface in the form of a stop is designed fundamentally for welding on a sheet metal roof, it need not meet any special requirements with respect to flatness or continuity. This is a major disadvantage in the case of cementing on a glass pane.

The technique of permanent joining by cementing requires a regular, continuous contact surface which runs essentially parallel to the element which is to be permanently joined. If there are defects of flatness and/or if there are interruptions, it is such that the regularity and continuity of application of the cement are no longer ensured. This results in a major risk of leaks once the pane has been attached. If this defect is to be remedied and/or the distance between the contact surface and the surface of the element to be connected has major deviations, there can be an attempt to apply additional cement. Unfortunately, it is well known in the technical field of cementing that an excess of cement cannot be absolutely linked to good attachment.

SUMMARY OF THE INVENTION

Accordingly, the object of this invention is to provide a roof element which is designed to close an opening which has been made in the roof of the motor vehicle and which has a translucent pane which is suited to be permanently joined to the contact surface which borders the opening, and the indicated roof element would make it possible to avoid the problems according to the prior art by enabling efficient cementing regardless of the profile of the contact surface and at the same time guaranteeing increased tightness of the connection which has been made in this way.

This object is achieved in accordance with the invention in that the roof element has at least one transition element which is attached permanently to the inner peripheral surface of the pane and which has a support surface which is essentially parallel to the part of the contact surface on which the indicated support surface is superimposed.

Each transition element is accordingly designed to be sandwiched between part of the peripheral inner surface and a corresponding part of the contact surface. The purpose is to compensate for the defects of flatness and/or interruptions of the contact surface and/or overly great deviations of the distance which exists between the inner peripheral surface and the indicated contact surface, according to circumstances.

The thickness of each transition element is therefore variable as a function of the profile of the corresponding part of the contact surface, but also as a function of the desired relative positioning between the glass pane and the indicated contact surface, viewed overall. The object is to permanently connect the inner peripheral surface on the contact surface by using a constant cement thickness which is a guarantee of perfect fixing and tightness.

The invention as defined above has the advantage that it can be adapted to a conventional motor vehicle, i.e., therefore, a motor vehicle which is primarily designed to receive a sheet metal roof. It is, in fact, more economical to adapt glass roofs instead of modifying the contact surface of any standard vehicle.

This invention also relates to features which arise in the course in this description and which can be considered individually or according to all their possible technical combinations.

Other features and advantages of the invention will become apparent from the following description in which embodiments are explained with reference to the drawings.

DETAILED DESCRIPTION OF THE INVENTION

For reasons of clarity the same elements are labeled with the same reference numbers in all figures. Likewise only the elements critical to the understanding of the invention are shown, regardless of the scale and each time in schematic form.

Figure 1:
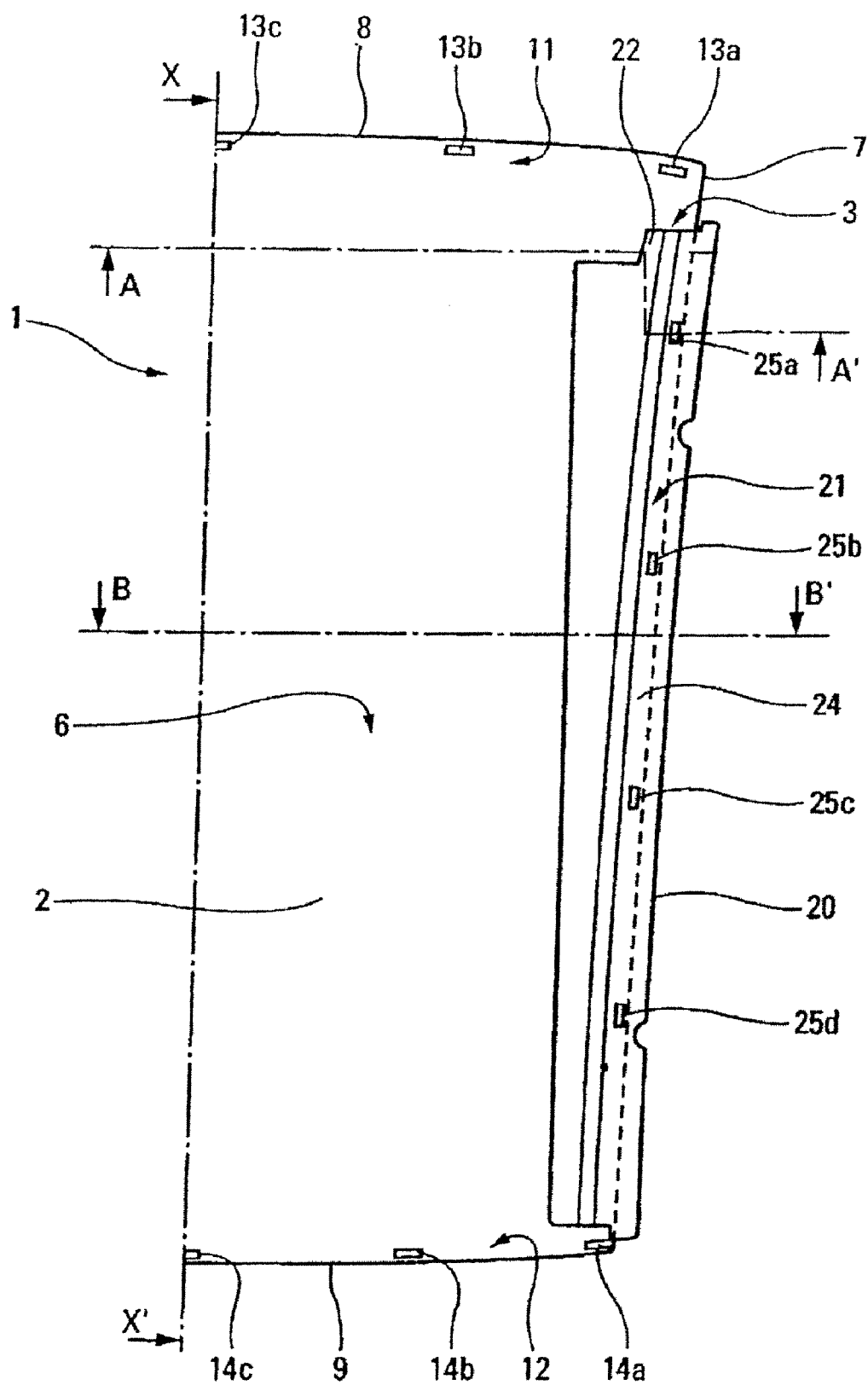
FIG. 1 is a bottom plan view of a portion of a translucent roof element in accordance with the invention.

FIG. 1 shows a translucent roof element 1 which is designed to close an opening 102 made in the roof 101 of a motor vehicle 100. Only one longitudinal half is visible here, but it is clear that the roof element 1 is in fact completely symmetrical with respect to the plane X-X' so the description of the half shown also applies to that which has been omitted.

Figure 2:
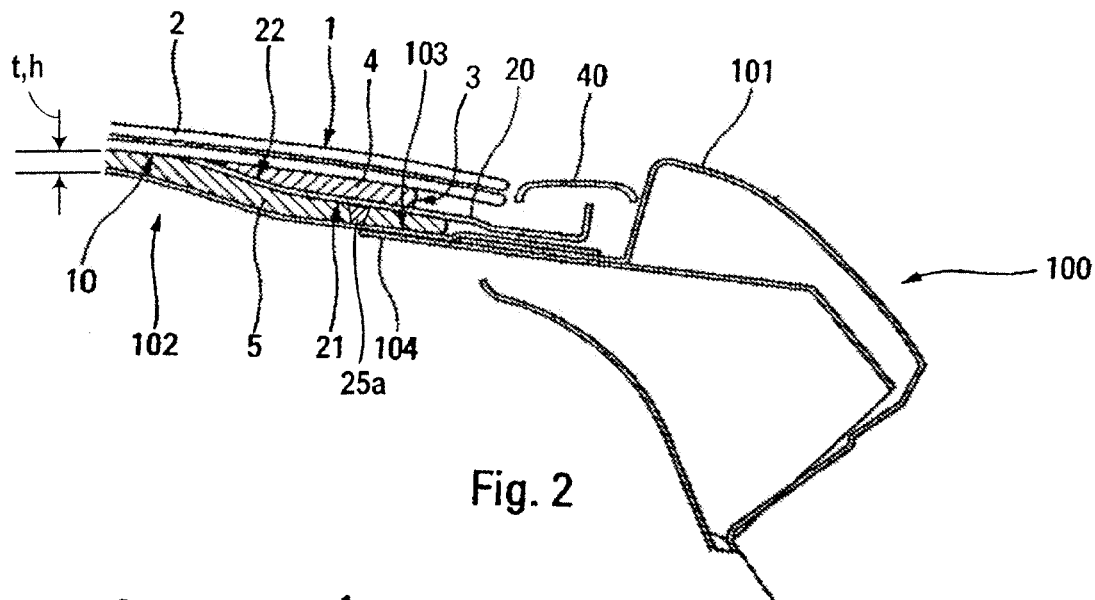
FIG. 2 shows the roof element of FIG. 1 in a cross section taken along plane A-A' thereof.
Figure 3:
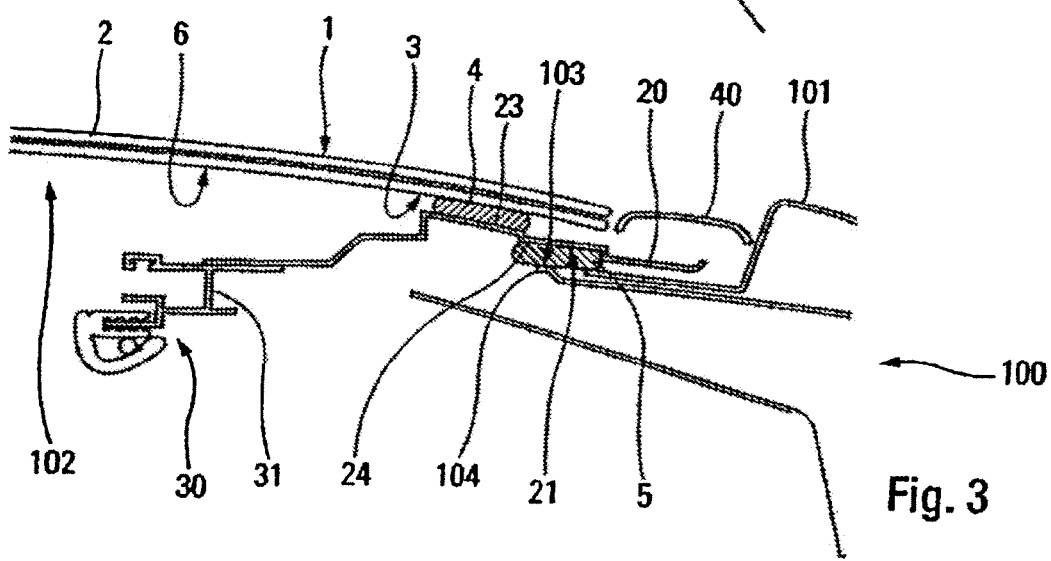
FIG. 3 shows the roof element of FIG. 1 in a cross section taken along plane B-B' thereof.

As is apparent from FIGS. 2 & 3, the opening 102 is bordered by a stop 104 which forms the contact surface 103 which is an integral component of the body structure that forms the roof 101. The roof element 1, on the one hand, has a translucent pane 2 which is permanently connected (or can be permanently connected) to the indicated contact surface 103.

In this special embodiment, which is given simply as an example, the translucent pane 2 is made of glass. However, it is obvious that any other transparent or translucent material could be equivalently used.

According to the subject matter of this invention, the roof element 1 has two transition elements 20 which are permanently joined by a cement bead 4 on the peripheral inner surface 3 of the pane 2. Each transition element 20 has a support surface 21 which runs essentially parallel to part of the opposing support surface 103. The permanent connection between the support surface 21 and the indicated corresponding part of the contact surface 103 is, in turn, executed by cementing, this time via a cement bead 5.

It should be noted that the peripheral inner surface 3 is defined as any surface which is located on the edge or on the inside 6 of the pane 2.

Each transition element 20 is thus able to compensate for any irregularity of parallelism and/or of the distance between the peripheral inner surface 3 and the contact surface 103. Cementing can then advantageously be done with a constant cement thickness "t" for an optimum connection and tightness.

In other words, each transition element 20 has an essentially complementary shape to the corresponding part of the contact surface 103. Therefore, it forms an ideal transition element for the connection of these two elements which are almost never complementary in practice, and it should be emphasized that the regularity and continuity of cement application constitute criteria essential for good cementing.

In this embodiment which was selected for explanation of the invention, only the two lengthwise edges 7 of the glass pane 2 have transition elements 20 which are otherwise completely symmetrical. The two transverse edges forward 8 and to the rear 9 of the glass pane 2, for their part, have no transition elements 20 at all.

As can be seen in FIG. 2, the ends of each transition element 20 are advantageously made such that they have no interruptions with reference to the directly adjacent parts 10 of the peripheral inner surface 3. In this example each of the pertinent ends have a beveled part 22 which is able to keep essentially constant the thickness "t" of the cement bead 5 which connects the transition element 20 and the contact surface 103.

According to one special feature of the invention, each transition element 20 has a shape which corresponds essentially to the space which on the one hand separates the peripheral inner surface 3 and on the other the contact surface 103 which is covered with a constant and suitable cement thickness "t" when the relative positioning of the indicated peripheral inner surface 3 and the indicated contact surface 103 is optimum.

In practice, therefore, any transition element 20 has a complex shape which results from the often complicated profile of the contact surface 103. The convex part of the contact surface 103 corresponds to each concave part of the transition element 20 and vice versa.

According to another feature of the invention, each transition element 20 has an inner surface 23 with a shape which is essentially complementary to the part of the peripheral inner surface 3 to which it is connected by cementing, and an outer surface 24 which forms a support surface 21 with a shape which is essentially complementary to the part of the contact surface 103 to which it is likewise connected by cementing.

Figure 4:
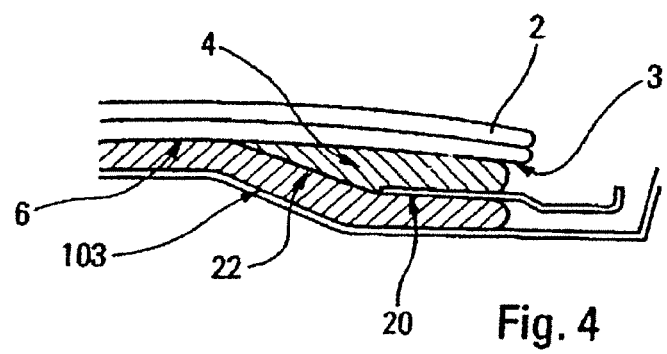
FIG. 4 is an enlarged view of a portion of FIG. 1 in the area of the transition element of the invention.

According to the version shown in FIG. 4, the transition between the support surface 6 of the cement on the glass and the support surface of the cement on the transition element 20 is ensured by the support surface 22 which is formed by fabrication of the glass/transition element or by a molded cement between the glass and the transition element.

As is apparent from FIG. 1, each transition element 20 is provided with a plurality of projecting parts which form calibration stops 25a, 25b, 25c, 25d with a height "h" (shown in FIG. 2) which corresponds to the desired thickness "t" of the cement. The distal end of each calibration stop 25a, 25b, 25c, 25d is designed to come into contact with the support surface 103. The presence of these projecting calibration stops 25a, 25b, 25c, 25d enables positioning of the glass pane 2 connected to the transition elements 20 with reference to the contact surface 103 with a relatively given distance according to the desired thickness "t" of the cement. Preferably the indicated calibration stops 25a, 25b, 25c, 25d are regularly distributed along each transition element 20.

FIG. 1 shows likewise that in a similarly advantageous manner each free part 11, 12 of the peripheral inner surface 3 has several calibration stops 13a, 13b, 13c; 14a, 14b, 14c, 15c with a height "h" (shown in FIG. 2) corresponding to the desired cement thickness "t". It should be noted that the free part 11, 12 is defined of course as any part of the peripheral inner surface 3 which is not provided with any transition element 20. Here again the calibration stops 13a, 13b, 13c; 14a, 14b, 14c, 15c are also advantageously distributed regularly along each free part 11, 12.

In this embodiment, each transition element 20 is made of metal. However, in an equivalent manner, it could also be made of plastic material which can optionally be a thermoplastic or duroplastic material or it could also be formed by a cement bead of extruded polyurethane which is applied directly to the glass pane 2.

As shown in FIG. 3, the roof element 1 can be joined to a known darkening mechanism 30 which can extend parallel to the inside surface 6 of the glass pane 2 in order especially to limit the greenhouse effect within the passenger compartment of the motor vehicle 100 on days with high incident solar radiation. In this example, it is especially advantageous that one or more transition elements 20 are able to carry the darkening mechanism 30 and especially its guide rails 31. This feature enables direct permanent connection of the darkening mechanism 30 to the roof element 1 and thus advantageous formation of a proper, complete module which is ready to be installed.

Of course each transition element 20 can be used to hold other parts of the motor vehicle 100, such as, for example, external trim 40 or an inner lining.

What is claimed is:

1. Roof element for closing an opening in a roof of a motor vehicle, comprising:
    a translucent pane for permanent connection to a contact surface which borders an opening of a roof of a motor vehicle;
    at least one transition element joined permanently to an inner peripheral surface of the pane and having a support surface, the transition element having a complex shape that varies as a function of a distance between the inner peripheral surface and the contact surface on which the support surface is to be superimposed for connection of the pane to the motor vehicle such that the support surface is substantially parallel to the contact surface;
    a first cement bead disposed between the pane and the transition element; and,
    a beveled part forming a transition for the first cement bead between the pane and the transition element, the beveled part being formed of one of:
        (a) a glass/transition element provided between the translucent pane and the transition element; and
        (b) a molded cement element provided between the translucent pane and the transition element.

2. Roof element as claimed in claim 1, wherein the transition element has a shape which corresponds essentially to a space which separates the inner peripheral surface and the contact surface when the contact surface is covered with a cement of constant thickness.

3. Roof element as claimed in claim 1, wherein the transition element has an inner surface with a shape which is essentially complementary to part of the inner peripheral surface of the pane to which it is permanently connected, and an outer surface which forms the support surface with a shape which is essentially complementary to the part of the contact surface on which it is to be superimposed.

4. Roof element as claimed in claim 1, wherein the transition element has at least one projecting part which forms a calibration stop with a height that corresponds to a desired thickness of a second cement bead adapted to be disposed between the support surface of the transition element and the contact surface of the motor vehicle.

5. Roof element as claimed in claim 4, wherein the pane further comprises two free parts disposed on the inner peripheral surface thereof, each free part having at least one calibration stop with a height corresponding to a desired thickness of the second cement bead.

6. Roof element as claimed in claim 5, wherein the calibration stops are distributed regularly along the inner peripheral surface of the pane.

7. Roof element as claimed in claim 1, wherein each transition element has at least one projecting part which forms a calibration stop with a height that corresponds to a desired thickness of a cement bead adapted to be disposed between the support surface of the transition element and the contact surface of the motor vehicle.

8. Roof element as claimed in claim 7, wherein the calibration stops are distributed regularly along the inner peripheral surface of the pane.

9. Roof element as claimed in claim 1, wherein the pane further comprises two free parts disposed on the inner peripheral surface thereof, each free part having at least one calibration stop with a height corresponding to a desired thickness of a cement bead adapted to be disposed between the support surface of the transition element and the contact surface of the motor vehicle.

10. Roof element as claimed in claim 9, wherein the calibration stops are distributed regularly along the inner peripheral surface of the pane.

11. Roof element as claimed in claim 1, wherein the transition element is provided with a darkening mechanism that extends parallel to an inside surface of the pane.

12. Roof element as claimed in claim 1, wherein the transition element is made of metal.

13. Roof element as claimed in claim 1, wherein the transition element is made of plastic.

14. Roof element as claimed in claim 1, wherein the transition element is permanently joined to the pane by cementing.

15. Roof element as claimed in claim 1, wherein the pane is made of glass.

16. Method of permanently attaching a translucent pane to a roof opening of a motor vehicle, which motor vehicle is provided with a contact surface constructed for receiving a sheet metal roof panel, the method comprising:
    permanently joining at least one transition element to an inner peripheral surface of the pane, at least a portion of the transition element having a complex shape that varies as a function of a distance between the inner peripheral surface of the pane and the contact surface of the motor vehicle;
    superimposing the transition element onto the contact surface of the motor vehicle such that a support surface of the transition element is substantially parallel to a part of the contact surface;
    connecting the support surface of the transition element to the contact surface of the motor vehicle with a first layer of cement having a constant thickness;
    providing a second layer of cement between the inner peripheral surface of the pane and the transition element to permanently join the transition element to the pane; and
    transitioning the second layer of cement between the translucent pane and the transition element by forming one of:
    (a) a beveled glass/transition element between the translucent pane and the transition element; and
    (b) a beveled molded cement element between the translucent pane and the transition element.

* * * * *